United States Patent [19]
Honda et al.

[11] Patent Number: 5,218,349
[45] Date of Patent: Jun. 8, 1993

[54] MULTI-BACKSPACE KEY SYSTEM FOR KEYBOARD OPERATION

[76] Inventors: Joji Honda, 202-2416 W. 3rd Ave., Vancouver, B.C., Canada, V6K 1L8; Yuji Honda, 31-2 Meigetsucho, Shouwaku, Nagoya, Aichi, Japan, 466

[21] Appl. No.: 594,300

[22] Filed: Oct. 9, 1990

[51] Int. Cl.$^5$ .............................................. G09G 5/00
[52] U.S. Cl. ..................................................... 340/711
[58] Field of Search ............... 340/711, 792, 825.19, 340/706, 709

[56] References Cited

U.S. PATENT DOCUMENTS 5,041,819  8/1991  Takeda .............................. 340/711

OTHER PUBLICATIONS

Word Perfect the Complete Reference, Karen L. Acerson, McGraw-Hill Dec. 1988.
Nikkei Industry Newspaper, Workers in their 40's and Over Operate Keyboards at 60% of their Age Groups, Nov. 2, 1989.
Nikkei, conquering allergy, Nov. 8, 1989, evening edition.
Stephen Manes, Daddy's hands hurt like the Dickens, PC Magazine, Mar. 15, 1988, p. 85.

Primary Examiner—Jeffery A. Brier

[57] ABSTRACT

A method for moving a cursor (14) back one space on a display screen by a second, same character key stroke at a keyboard, comprising the steps of: catching and storing a key information (16) when a key is stroked at the keyboard; selecting a character information from each key stroke; comparing key information (16) including a character information (10) in a storage area with a next key information (18) including a next character information (12), immediately following key information (16); and moving cursor (14) back one space on the display if both key information (16) and next key information (18) are the same. Or a method comprising the steps of: catching and storing a key information (16) when a key is stroked; comparing directly key information (16) with a group of key informations; and moving cursor (14) back one space if key information (16) is the same as any one of the group of the key informations, so that unskilled keyboard operators can press one of many keys to move cursor (14) back one space with 100% accuracy, with ease and without using the backspace key or the cursor left key.

12 Claims, 8 Drawing Sheets

```
new_keyboard_io           proc       far
    assume    cs:cseg,ds:cseg
    sti
    cmp       ah,0
    je        ki0              — A
    assume    ds:nothing
    jmp       old_keyboard_io
ki0:
    pushf
    assume    ds:nothing
    call      old_keyboard_io
                              12
    cmp       chr0,al
    je        backward         B
    mov       chr0,al
                              12
    jne       kidone
                 10
backward:
    mov       chr0,al
    cmp       al,33
    jl        kidone
    mov       al,8             — C
    jmp       kidone
kidone:       12
    iret
new_keyboard_io           endp
```

FIG 1

```
        ;TypoMate.com cseg        segment
  assume    cs:cseg,ds:cseg
  org       100H
 start:
  jmp       begin
 old_keyboard_io DD  0
 chr0                 DB  ?

begin:

jmp        initialize initialize:
  assume    cs:cseg,ds:cseg
  mov       bx,cs
  mov       ds,bx
  mov       al,16H
  mov       ah,35H
  int       21H
  mov       word ptr old_keyboard_io,bx
  mov       word ptr old_keyboard_io [2],es
  mov       dx,offset new_keyboard_io
  mov       al,16H
  mov       ah,25H
  int       21H mov       dx,offset initialize
  int       27H cseg        en
  end       start
```

```
100 CLS:X=1:Y=1
200 LOCATE Y,X:PRINT CHR$(220);
300 AL$=INKEY$                    —A
400 IF AL$="" THEN 300
500 AL=LEN(AL$)
600 IF AL>1 THEN AL$=RIGHT$(AL$,1)
700 IF AL$=CHR$(8) OR AL$=CHR$(9) OR AL$=CHR$(13)
    OR AL$=CHR$(15) OR AL$=CHR$(32) THEN 1500
800 IF AL$=CHRO$ AND AL=1 THEN LOCATE Y,X:PRINT" ";:X=X-1
900 IF AL>1 THEN 1400
1000 LOCATE Y,X:PRINT AL$;
1100 IF AL$=CHRO$ THEN 1200 ELSE X=X+1
1200 CHRO$=AL$
1300 GOTO 200
1400 LOCATE Y,X
1500 IF SCREEN(Y,X)<>220 THEN
     PRINT CHR$(SCREEN(Y,X));ELSE PRINT" ";
1600 IF AL$=CHR$(75) THEN X=X-1:GOTO 200
```

FIG 3

```
100 CLS:X=1:Y=1
200 LOCATE Y,X:PRINT CHR$(220);
300 AL$=INKEY$                    —A
400 IF AL$="" THEN 300
500 AL=LEN(AL$)
600 IF AL>1 THEN AL$=RIGHT$(AL$,1)
700 IF AL>1 THEN 1400
800 IF AL$=CHRO$ THEN LOCATE Y,X:PRINT" ";:X=X-1   —C
900 IF AL$=CHR$(27) THEN AL$=CHRO$:LOCATE Y,X:PRINT AL$;:X=X+1:
     GOTO 200
1000 LOCATE Y,X:PRINT AL$;
1100 IF AL$=CHRO$ THEN 1200 ELSE X=X+1
1200 CHRO$=AL$
1300 GOTO 200
1400 LOCATE Y,X
1500 IF SCREEN(Y,X)<>220 THEN
     PRINT CHR$(SCREEN(Y,X));ELSE PRINT" ";
1600 IF AL$=CHR$(75) THEN X=X-1:GOTO 200
```

FIG 4

```
 1 6
  10 CLS:X=1:Y=1
 100 CLS                              1 4
 300 LOCATE Y,X:PRINT CHR$(220);
 400 AL$=INKEY$        A
 500 IF AL$="" THEN 400
 600 AL=LEN(AL$)
 610 IF AL>1 THEN AL$=RIGHT$(A$L,1):
         GOTO 1300
 700 LOCATE Y,X:PRINT " ";
 800 IF CHRO$<>AL$ THEN                1 0
         CHRO$=CHR$(SCREEN(Y,X-1))     1 2
 900 IF CHRO$=AL$ THEN X=X-1      C
1000 LOCATE Y,X:PRINT AL$;             1 0
1100 IF CHRO$=AL$ THEN 1200 ELSE X=X+1
1200 GOTO 300
                        1 0    1 2
   B
```

FIG 5

```
old_keyboard_io   DD   0
chr0              DB   ?
chr1              DB   ?
rotor             DB   ?
begin:

new_keyboard_io                proc      far
    assume    cs:cseg,ds:cseg
    sti
    cmp       ah,0
    je        ki0
    assume    ds:nothing
    jmp       old_keyboard_io
ki0:
    pushf
    assume    ds:nothing
    call      old_keyboard_io cmp       rotor,0
    je        ki1
    cmp       rotor,1
    je        ki2 ki1:
    add       rotor,1
    mov       chr0,al
    cmp       al,chr1          ─ B
    jne       kidone
    jmp       backward ki2:
    mov       rotor,0
    mov       chr1,al
    cmp       al,chr0          ─ B
    jne       kidone backward:
    cmp       al,33
    jl        kidone
    mov       al,8             ─ C
    jmp       kidone
  kidone:
    iret
new_keyboard_io                endp
```

FIG 6

```
keyread      proc      near
readchar:       1  6
    pushf
    call     old_keyboard_io
    cmp      al,0         ──── A
    je       extended
    cmp      off,1        ──── S1
    je       readdone
    call     number       ──── A
readdone:
    ret extended:
    call     on_off
    cmp      off,1        ──── S2
    je       readdone
keyread      endp ┌─────────────────────────────┐
│on_off       proc      near  │
│    cmp      ah,118          │
│    je       shut_off        │
│    cmp      ah,132          │
│    je       switch_on       │
│    ret                      │
│on_off       endp            │── S3
│                             │
│shut_off:                    │
│    mov      off,1           │
│    ret                      │
│switch_on:                   │
│    mov      off,0           │
└─────────────────────────────┘
    ret      1  6
number       proc      near
    cmp      al,58        ──── D
    jl       backward
    ret      1  6
backward:
    cmp      al,43        ──── D
    je       comeback
    cmp      al,45
    jl       kidone
    cmp      al,46   1 6
    je       kidone
    cmp      al,47
    je       kidone
comeback:
    mov      al,8         ──── C
kidone:
    ret      1  6
number       endp
```

FIG 7

```
new_keyboard_io   16        proc    far
    sti
    cmp       ah,0
    je        ksread
    cmp       ah,1                            ┐
    je        ksstat                          ┘─ A
    assume    ds:nothing
    jmp       old_keyboard_io ksread:
    call      keyread
    iret
ksstat:
    call      keystat
    ret       2
new_keyboard_io            endp assume    ds:nothing
keystat       proc    near
    pushf
    call      old_keyboard_io
    ret
keystat       endp
keyread       proc    near
readchar:
    pushf
    call      old_keyboard_io                 ┐
    cmp       al,0                            ┘─ A
    je        extended
    je    16  readdone
readdone:
    ret
                   16
extended:
    cmp       ah,69                           ┐
    jl        backward                        ┘─ D
    je        readdone
keyread                    endp
              16
backward:
    cmp       ah,58                           ─ D
    jl        kidone
    mov       al,8                            ─ C
kidone:   ret
          16
```

FIG 8

Flow Charts

MULTI-BACKSPACE KEY SYSTEM FOR KEYBOARD OPERATION

BACKGROUND

1. Field of Invention

This invention relates to keyboard operation on a computer system, specifically, an addition to the erase function.

2. Description of Prior Art

Computers and word processors are more and more prevalent in offices and homes. There are many opportunities to use these remarkable machines, but access to their power is limited by one's skill at operating the keyboard. Indeed, it is often necessary to take arduous, time consuming training to acquire the skill to operate keyboards well. In extreme cases, bosses in offices discourage their higher employees from using these outstanding machines and ask them to employ a specialist as a keyboard operator.

According to an article published by the leading Japanese financial newspaper, Nikkei, on Nov. 8, 1989, an outstanding telecommunication company, NTT, conducted a survey of 500 men working for prominent companies in Tokyo. They found that less than 15% of all male employees can operate keyboards well, while others suffer from "keyboard allergy". There is no available method that helps everyone operate keyboards with ease.

In an article published in PC Magazine on Mar. 15, 1988, Stephen Manes states that poorly designed keyboards cause frustration and irritation. In the wrong hands, even well designed keyboards lead to painful and disabling injuries. He describes IBM's Enchanted Keyboard, the one that arrived as an "improvement" with late-model ATs and the only one you can get with the PS/2 line with the Model 25. (IBM, AT, PS/2, and Model 25 are registered trademarks of IBM.) He explains that this keyboard causes even more annoyance than original, and he maintains that we're addressing mere frustration. Pain is more serious, and many users suffer from it. People's hands hurt during long days in front of keyboards—and continue to hurt after their day is done. The problem appears to be growing. He concludes that deviation from a straight-wristed typing position—which happens every time most users reach for function or arrow keys—can intensify the problem and stress the nerves of the hand. Further, he explains that a victim he knows has pains in his hand which he traces to the extra motion required to reach over to the cursor keys. He expresses a hope that somebody will come to the rescue and take the problem seriously enough to make a dedicated effort to quantify and solve it. Even the current improved standard keyboards locate cursor movement keys (the backspace key and arrows keys) too far from the normal wrist position. They are on the keyboards at the far right hand side on the keyboard. That seems to be one of problems that leads to pain and frustration.

Why do most people need extensive, arduous training to operate keyboards well? To begin with, even if beginners can successfully remember all key locations and become accustomed to the key operations, they must still go through the following, strenuous, demanding process when they make a mistake: i) move their eyes from the screen to the keyboard. ii) look for an erase key on the keyboard (these keys, backspace or cursor left keys, are located on the far right hand side of the standard keyboard.). iii) the wrist must move from the normal position since these keys are located beyond the reach of the normal position. iv) press the erase key. v) return their eyes to the screen. vi) assure themselves that the cursor, a bar of light that indicates position on the display screen, has moved one space back and has erased the character that was there. vii) make sure the wrist of the right hand has returned to proper position. Finally, they can press the correct key. Many times there will be another error made in completing these steps and some or all of this process will have to be repeated. Furthermore, if they make 5 mistakes a line and there are 25 lines a screen, then there are 5 mistakes×25 lines or 125 mistakes. So there are 125 mistakes×7 steps or over 875 extra steps that geginner operators will make in a screenful of work. Before they have finished, they not only tire of operating the keyboard but also feel frustration in the creation of their documents. They also might feel eye strain because of frequent up-down eye movement and because of color changes between the screen and the keyboard.

The current standard keyboard operation systems known such as IBM PC; (a registered trademark of IBM) or JIS, Japanese Industrial Standard, suffer from a number of disadvantages:

(a) Operators can use only two keys—the backspace key, which erases the previous character, or the cursor left key which moves the cursor back and allows a type-over to erase a mistyped character.

(b) To try to move the cursor back, beginner keyboard operators usually cannot reach the backspace or the cursor left key without lifting their hands from the keys. This is because these keys are located far from the center of the keyboard. People often press a wrong key when trying to strike the backspace key and compound their error.

(c) Most beginners must search visually for the backspace key. This is because its position on the far right of the keyboard and fourth row from the bottom is remote from the normal hand position on the keys.

(d) Because of the location of the backspace key and the cursor left key, keyboard operators are required to stretch their normal wrist position. There is a tendency for them to harm their fingers because of this stretch.

(e) Beginners cannot keep their eyes on the keyboard for long periods because they frequently type errors and then have to look for the backspace key. This hinders the development of skills.

(f) With current systems, when poor users guess at the location of an intended key and make a mistake, they can correct the mistake only with the difficult procedures mentioned above. They are therefore normally required to practice for a long time and may require the help of a typing tutor to acquire usable skills.

(g) Current systems, which are designed for experts, are very hard for the beginner to use. People who have no formal training often feel frustrated and helpless.

(h) A special keyboard designed to ease injury on left hand fingers is known, but this solution requires replacement of current keyboards.

(i) Beginners must often take separate typing lessons before effectively creating documents.

(j) Currently almost all famous word processing programs are solely word processing programs. They do not provide any typing help for beginners within the programs.

(k) Unskilled typists must practice typing for long periods at the keyboard with or without a typing tutor. They often feel frustrated or get tired too quickly to complete documents or effectively operate computers or word processors.

(l) Current systems require following many instructions to master typing skills.

(m) We can not replace the countless currently used keyboards with new ones that have a new key arrangement because of the prohibitive cost.

(n) With the current system users can move the cursor more than one space back only by continuous pressing of only two keys, namely the backspace key or the cursor left key.

(o) Certain keys are very difficult to reach without looking at them. A lot of experience is necessary to hit these keys accurately.

OBJECTS AND ADVANTAGES

Accordingly, several objects and advantages are:

(a) to provide a system which gives almost any keyboard key an erase function like the backspace key function;

(b) to provide a system which allows the beginner keyboard operator to erase a mistyped entry effortlessly and immediately with 100% accuracy and without looking at the keyboard;

(c) to provide a system which allows keyboard operators to erase an error conveniently, with almost any key on a keyboard without looking at the keyboard;

(d) to provide a system which offers many, many erase keys besides the backspace or cursor left keys; users who are accustomed to harmful reaches over the keyboard can use these other keys and consequently prevent finger injury on their right hands;

(e) to provide a system which invites poor typists to keep their eyes comfortably on the display screen all the time; this will prevent eye strain resulting from frequent up-down eye movement or from the color change between the display and the keyboard;

(f) to provide a system which encourages poor users to guess at the location of an intended key without looking at the keyboard; even if they make a mistake, they can readily correct it by pressing again the same key; they can then choose the right key which is most likely nearby the mistaken key; this habit of not looking at the keyboard will improve their typing skill;

(g) to provide a system which is designed to help users be self-assured without looking at the keyboard, to make guesses at key locations, and to make corrections with ease; this will make users more comfortable and will promote efficiency in work;

(h) to provide a system which can be latent and work harmoniously with a favorite word processing program such as WordStar Professional 4.0, WordPerfect 4.2, MultiMate Advantage 3.5 (which are registered trademarks of MicroPro Intl. Corp., WordPerfect Corp., and MultiMate Intl. respectively), with computer languages such as Quick Basic 4.5 (a registered trademark of Microsoft), and with other programs such as operation systems, etc., so that users fully enjoy these word processing or other programs;

(i) to provide a system with a latent nature which can be turned on or off according to need, so the computer is not unnecessarily shut off and started again;

(j) to provide a system which can be produced as a main feature with other functions of a word processing program so beginners can start all these systems at the same time;

(k) provide a system which users can enjoy as a typing tutor while they complete their writing tasks;

(l) provide a system which requires almost no instruction to use;

(m) provide a system which is very inexpensively produced;

(n) provide a system by which the cursor can move one space back and erase an error when the user has pressed a wrong key simply by the pressing of the same key again;

(o) provide a system by which users can move the cursor to any space behind the cursor space on the display by repetitive strokes of the last character key stroked or of any other character key; and (q) provide a system by which one of a designated group of keys is pressed to move the cursor back one space.

Further objects and advantages of my invention will become apparent from a consideration of the ensuring description and drawings.

DRAWING FIGURES

FIG. 1 shows a system written with an assembler language by Microsoft Macro Assembler 5.0 for IBM PC/XT/AT, and shows one memory cell for character information.

FIG. 2 shows the basic system written with assembler language for latency used in conjunction with FIG'S 1, 6, 7, and 8.

FIG. 3 shows a system written with Basica (an advanced Basic, a computer language) by Microsoft for IBM PC, and deals with two key informations, and it provides one function for a word processing program.

FIG. 4 slso shows a system written with Basica, and deals with two character informations, and also it provides one function for a word processing program.

FIG. 5 shows a system written with Basica, holds no memory cell for character information, but it gets this information from the display screen.

FIG. 6 shows a system written with assembler language and shows two memory cells for character informations.

FIG. 7 shows a system, written with assembler language, with a function for any number key (0, 1 to 9) and the +, and − keys on the IBM PC keyboard, and it also shows a switch system.

FIG. 8 shows a system, written with assembler language, with a function for any function key (F1 to F10) on the left hand side of the keyboard.

Figure 9:
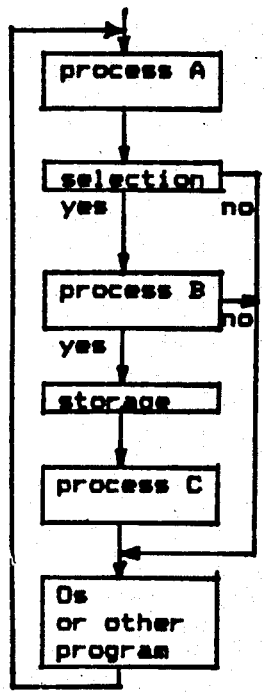
Figure 10:
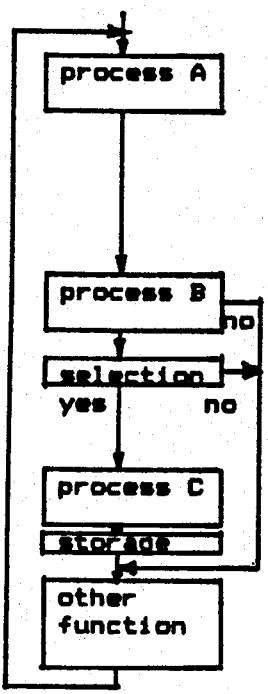
Figure 11:
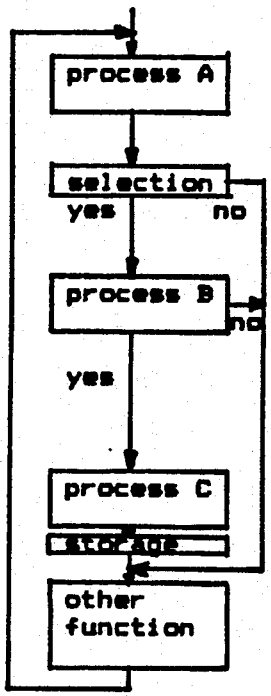
Figure 12:
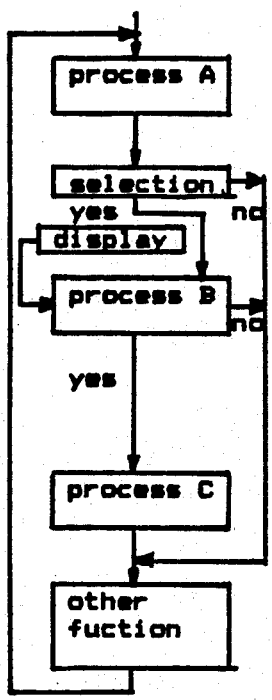
Figure 13:
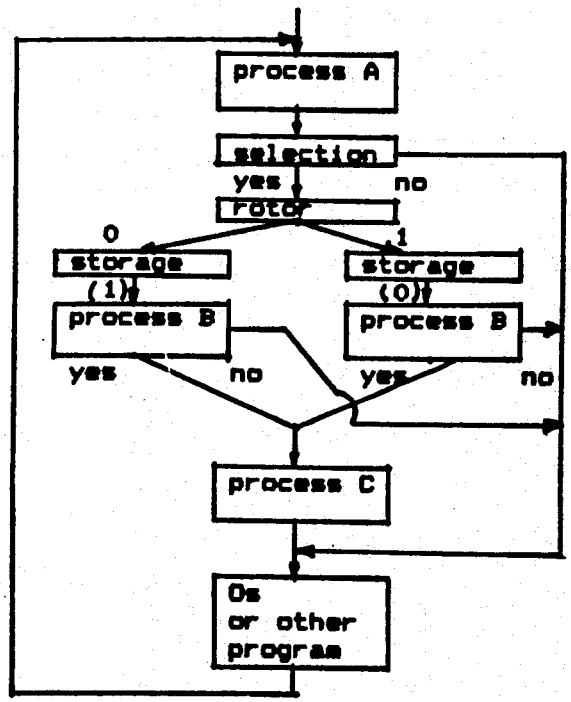
Figure 14:
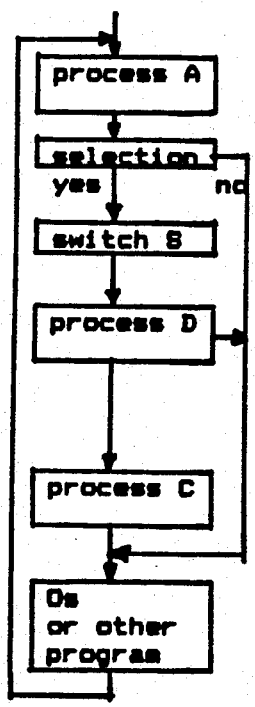
Figure 15:
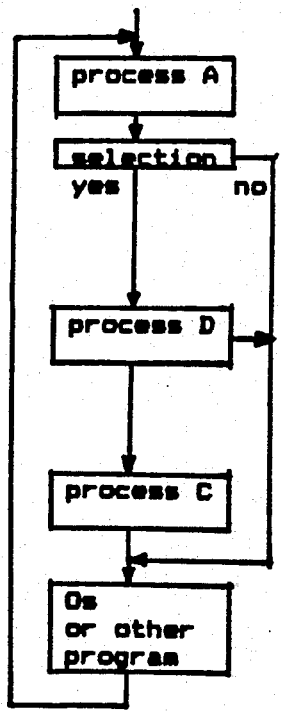

FIG. 9 illustrates FIG. 1 in flow chart form.
FIG. 10 illustrates FIG. 3 in flow chart form.
FIG. 11 illustrates FIG. 4 in flow chart form.
FIG. 12 illustrates FIG. 5 in flow chart form.
FIG. 13 illustrates FIG. 6 in flow chart form.
FIG. 14 illustrates FIG. 7 in flow chart form.
FIG. 15 illustrates FIG. 8 in flow chart form.

REFERENCE NUMERALS AND ALPHABET IN DRAWINGS.

A: process to catch information resulting from a key stroke on a keyboard.

B: process to compare key information 16 including character information 10 with next key information 18 including next character information 12.

C: process to make cursor 14 on the display move one space back.

D: process to check key information 16 resulting from process A.
S: switch.
10: character information resulting from a character key stroke on a keyboard.
12: next character information resulting from a character key stroke on a keyboard, immediately following character information 10.
14: a cursor on a display.
16: key information resulting from a key stroke on a keyboard.
18: next key information immediately following key information 16.

FLOW CHART FIGURES

FIG. 9, FIG. 10, FIG. 11, FIG. 12, FIG. 13, FIG. 14, and FIG. 15 correspond to FIG. 1, FIG. 3, FIG. 4, FIG. 5, FIG. 6, FIG. 7, and FIG. 8 respectively.

REFERENCE WORDS IN FLOW CHARTS

| | |
|---|---|
| selection | selecting a character information from a key information. |
| storage | memory cells for a character information. |
| display | display screen. |
| Os | operating system. |

DESCRIPTION—FIGS. 1 TO 8

FIG. 1 shows a typical embodiment of the Multi-Backspace Key System for Keyboard Operation (written with Macro Assembler 5.0, a computer language created by Microsoft for IBM PC/XT/AT; Macro Assembler is a registered trademark of Microsoft Corporation, XT is a registered trademark of IBM. The Assembler language program in FIG. 2 is complete and makes the system latent, i.e., the system can work in conjunction with another word processing program. However, the basic system without latency can be written with other languages such as IBM Basic, as in FIGS. 3; 4; and 5, or C language or Pascal etc. IBM Basic is a trademark of IBM). The system has a process A to catch key information 16, ah, resulting from the key stroke on a keyboard of a word processor or a computer. Character information 10, resulting from a character key stroke on the keyboard, is chr0. The next character information 12, resulting from a next immediate character key stroke is al. Process B is the second process. Its function is to compare character information 10 with next character information 12. The following process, process C, makes cursor 14 on the display move one space back if character information 10 and next character information 12 are equal. In process C, character information 12 becomes an 8, a backspace key information on ASCII, the American Standard Code for Information Interchange. FIG. 1 also shows a location of memory storage after the comparison. Next character information 12 is is stored in a memory storage, chr0, for a next comparison with a next coming character. A memory storage is used in FIG. 1, but another way without direct storage will be shown later in FIG. 5.

FIG. 2 shows the assembler language to make the system latent. This program serves as the outside of a frame of the programs in FIG. 1, FIG. 6, FIG. 7 and FIG. 8. This frame makes the system stay in its computer operation system until a keyboard key is pressed. Then the system takes over temporarily to do its function, and subsequently goes back to hide for a next key strike. This frame also makes the system do its function without disturbing another program. They are coexistent. The program also has process A which catches key information 16 when a key at the keyboard is pressed. The word ptr old.keyboard.io and word ptr old.keyboard.io [2] in A hold the all keyboard information when a key on the keyboard is pressed.

FIG. 3 shows the system written with IBM Basic, a computer language. The language command, INKEY$, is a function to catch key information 16 when a keyboard key is struck. Cursor 14 is CHR$(220), a square shape which displays on the screen. First when a key is struck, process A catches a key information 16, AL$. Second, next key information 18, AL$, from the keyboard, and the previous key information 16 in a memory storage CHR0$ left by AL$: (CHR0$=AL$), are compared in process B. Third, when next key information 18 is equal to any key information 16, the system then selects only those equalities that are character information, i.e., AL=1. These equalities move cursor 14 one space back by a process C (x=x−1). Conseqnently cursor 14 moves one space back on the display screen for a next move: PRINT CHR$(220), PRINT is a command in Basic and displays cursor 14 on the screen. Those equalities that are not character information (AL>1), i.e., the cursor direction keys etc. do not initiate a process C. The following key functions, the backspace ((AL$=CHR$(8)), tab→(AL$=CHR$(9)), enter (AL$=CHR$(13)), tab←(AL$=CHR$(15)) and space (AL$=CHR$(32)) are directed away from process C by means of the selection function. The selection of the character information is located at process B, but the location can be before process B as shown in FIG. 4.

FIG. 4 also shows the system written with IBM Basic, a computer language. The language command, INKEY$, is a function to catch key information 16 when a keyboard key is stroked. Cursor 14 is CHR$(220), a square shape which displays on the screen. First when a key is struck, process A catches a key information AL$. Second, next character information 12, AL$ from the next following key stroke is selected (if next character information results from a character key stroke, al is equal to 1). It and character information 10 from the first key stroke, are compared in process B (character information 10 has been captured from a memory storage CHR0$ left by AL$: CHR0$=AL$). Third, if they are equal, cursor 14 on the horizontal location is reduced by one in a process C (x=x−1). Consequently cursor 14 moves back one space on the display screen for a next move: PRINT CHR$(220), PRINT being the command in the Basic that displays cursor 14 on the screen.

A break in the process detailed above is initiated if the Esc key, CHR$(27), is pressed. In this case the character next left to the cursor, CHR0$, on the display will appear at the cursor location (AL$=CHR$(27)), and the cursor will move to the next space to the right. The striking the Esc key is a convenient method of producing consecutive characters on the screen.

This system as shown in FIG. 4, and also in FIG. 3 has only one memory storage for character information 10. The memory storage is located after the cursor movement in this system. The system can be a part of a word processing program. Typos Exclusive, the unpublished program copyrighted in 1989 has this system in the program.

FIG. 5 shows the system in Basic language also. It resembles the one in FIG. 4. but the system does not have the direct memory storage for character information 10, CHR0$, for a comparison in process B. Instead, character information 10, CHR0$, gets the information from the next left space from the cursor 14 space on the display. CHR$ (SCREEN (Y, X−1)) is character information 10.

FIG. 6 is written in assembler language, too. This program is very similar to the one in FIG. 1, but it has two memory storages instead of one. The two memory storages chr0, chr1 are utilized for the coming character information, character information 12, al, to be compared with a previous character information, character information 10. It will be described below how the two storages are used. Before character information 12, al, gets to process B in the first stage, ki1, the information is stored in a memory storage chr0 for a next comparison with next coming character information in the second stage ki2 (move chr0 al). (Move is the language command to move the character information 12, al, into the first storage chr0). In the first stage, ki1, process B starts as shown in FIG. 1. In the same stage ki1, a guidance rotor becomes a number 1 from a number 0 so that the rotor will lead a next coming information to a second stage, ki2. Then a second comparison will take place in process B. Then, again, the rotor becomes a number 0 from a number 1, to guide the next information to stage ki1. This cycle will happen repeatedly. The location of each of the two storages can be placed after the process B. Adding storage cells by adding rotor numbers branches out the process B described above.

FIG. 7 is also written in assembler language. This program is quite different from the previous ones in FIG. 1, FIG. 3, FIG. 4, FIG. 5, and FIG. 6. The system in FIG. 7 has two differences from the previous ones. The previous systems compare key information 16 with next key information 18 or character information 10 with next character information 12 (to determine equality). But the system in FIG. 7 does not use the comparison of two key informations or two characters informations; the system does not have a process B. Instead, the system always checks the first coming information, key information 16, al, in a process D. That is, it checks whether key information 16 is equal to any member of a group of character informations 0, 1, 2, 3, 4, 5, 6, 7, 8, 9, or +, or − (these keys are ASCII value greater than 43 and less than 58 with values 45, 46, and 47 which are, , , ., and/respectively, eliminated). The system has process A and process C as shown in the other systems. In process C, if key information 16, al, is any key of the group of keys described above, then the key information, al, becomes an 8 value in ASCII value which is a backspace key information. This system has at least process A, process D, and process C.

In FIG. 7, the system has a first switch S1 in process A. The switch S1 is connected to the 'extended' second switch S2 in FIG. 7. If key information 16, al, is 0, which means the information is non character information, the first switch S1 connects to 'extended' in FIG. 7. Second switch S2 then calls 'on_off' which is the third switch S3. In the third switch S3, if key information 16, ah, is 118 value on ASCII, which is the information when a Ctrl key and a Pg Dn key has been pressed at the same time, the third switch S3 connects to 'shut_off'. In the 'shut_off', 'off' becomes 1. Similarly, in the third switch S3, if key information 16, ah, matches 132 value, which is the information when a Ctrl key and a Pg Up key has been pressed simultaneously, the third switch S3 connects to 'switch_on' where 'off' becomes 0. As result, when key information 16, al, comes in process A as non character information then it always goes to 'extended' where the 'off' states can be changed. On the other hand, in the first switch S1, if 'off' is 1, then the switch heads for exit, 'readdone'.

FIG. 8 is also written in assembler language. This program is quite similar to the one in FIG. 7 except that it utilizes a group of key informations, that is, the group consisting of the 10 key informations F1, F2, F3, F4, F5, F6, F7, F8, F9, and F10. These keys are located on the left side of the keyboard on IBM PC. In process A, key information 16 is caught (cmp al, 0; cmp is the language command to compare something. If al is 0 then key information 16, al, is caught). Process A is connected to process D. In the first part of process D, key information 16, ah, is compared to a 69 value on ASCII. If ah is equal to or over 69, then this program will do nothing except to lead to exit which is 'readdone'. If not, then the first part of process D is connected to a second part of process D where ah is compared to a 58 value on ASCII. If ah is equal to, or less than 58, then again process D leads to exit. Otherwise, it will lead to process C where key information 16, ah, becomes an 8 value which is a backspace key information. The ASCII values of 59, 60, 61, 62, 63, 64, 65, 66, 67 and 68 are the keyboard keys F1, F2, F3, F4, F5, F6, F7, F8, F9 and F10 respectively. ASCII value 75 (cursor left) may be utilized in place of value 8 (backspace) although in this case process C causes cursor 14 to move one space left without erasure of the character in that space.

From the description above, a number of advantages of the Multi-Backspace Key System for Keyboard Operation become evident:

(a) Almost any key on a keyboard besides the backspace and cursor left keys will provide an erase function if the same key is pressed a second consecutive time after a wrong key has been pressed;

(b) Beginner keyboard operators can erase a typo easily with 100% accuracy without looking at the keyboard;

(c) Keyboard operators are able to erase an error with almost any convenient key but without looking at the keyboard;

(d) Right hand finger injury is avoided since users are not required to reach for the backspace key or the sursor left key as this system provides an abundance of easily reached keys that initiate the backspace key function;

(e) Poor typists can keep their eyes comfortably on the display screen at all times, avoiding the eye strain resulting from up-down eye movement and from the color change between the display and the keyboard;

(f) Even poor or beginner typists can strike the keys freely, without hesitation and without looking at the keyboard; when they see a typographical error appear on the display screen, they can correct it immediately by striking the same key a second consecutive time; since most typos involve adjacent and nearby keys, these typists can hunt for the correct key around the key of the original typo, correcting subsequent errors in the same easy way as the first and without looking away from the display screen;

(g) The proper habit of keeping ones eyes on the display and the advantage of simple correction of mistakes will take frustration, stress, and boredom out of the user's task at hand;

(h) The latent nature of this system allows it to be used simultaneously with the user's preferred word processing or other program;

(i) The system has a convenient switch to turn on and off the system according to need;

(j) Beginner and novice computer users will enjoy the benefits of the Multi-Backspace Key System for Keyboard Operation immediately, as start-up of the word processing program will also start up the system;

(k) As the system tutors users in typing, they will be able to enjoy their word processing programs sooner, increasing their keyboard skills while they accomplish writing projects;

(l) Users require very little instruction to use this product;

(m) This product is very inexpensive;

(n) A user who notices a typo more than one space behind the cursor can simply make successive strokes on the last key struck to move the cursor back to the typo and erase it;

(o) A user who notices a typo more than one space behind the cursor may quickly choose at random any character key on the keyboard and successively strike this key to move the cursor back to the typo and erase it;

(q) A group of unused keys such as the group of numbers keys or the function keys may be designated as backspace keys so a typist need only press any one of these keys to move cursor 14 one space back.

OPERATION—FIGS. 1, 3, 4, 5, 6, 7, 8

The manner of using the Multi-Backspace Key System for Keyboard Operation is identical to other computer programs. There are two ways to start the program. In the first method, type the part of the program's name that is left of the period (.) in the name (for example, if a program's name is TyposWd.exe) then type TyposWd. Then you press an enter key or return key to start the program. TyposWd is a word processing program that contains the system and the system starts up with the program. In the second method if one wants to use the system with another favorite word processing program that does not contain the system as a feature, for example the program MultiMate Advantage (the program name is wp.exe and is registered trademark of Ashton-Tate), one proceeds by first typing the left of period part of the system's name, i.e., TypoMate from TypoMate.com, then pressing an enter or return key, and then typing the left of period part of the word processing program's name, i.e., wp. Consequently the Multi-Backspace Key System will start up with the word processing program. If one needs to do some work on the operation system like copying or seeing directories, then one just continues after ending the word processing program. TypoMate will stay and help one because of its latency.

Following are two fundamental functions of the system. First, if one has just pressed a wrong key, a second consecutive pressing of the same key will move cursor 14 back one space and erase the typo. Then by pressing the correct key which, in general, is a key nearby the wrong key originally pressed, the correct character will display on the screen. Second, if one finds a typo well behind the position of cursor 14 on the display, one can press again (i.e., a second consecutive stroke) the last key pressed and keep on pressing it until cursor 14 reaches the typo. Next, by pressing the correct key, one can correct the mistake. In fact, two consecutive strokes on any key will move cursor 14 back one space and further consecutive strokes on the same key will move cursor 14 back one space for each stroke to any desired point on the display.

Can any consecutive key information go through this system without losing its function? Some keys do not display key information when struck. For example the cursor up or down key which moves cursor 14 up or down. If, for an example, cursor right key is pressed, the system selects only character information 10 from key information 16 as shown in FIG. 4 and the key information for the cursor right key is moved out of the system as shown. Therefore, since the key information is not character information 10, the key information will exit the system and consequently cursor 14 will move to the next space to the right. Similarly, if the cursor right key is pressed again, the key information is next key information 18 and not a next character information 12, so that the next key information 18 can go through the system without alternation. Consequently, if the cursor right key is pressed consecutively the cursor will always move to the next space to the right. For this reason, cursor right function is preserved without moving back one space even though consecutive strokes on the cursor right key are made. This is true for all key informations of End, Enter, Cursor directions, Ins, Del, Pg up, Pg Dn, Indent keys, etc. as well as the space key.

The system works in a similar manner in FIG. 3. However as explained previously the selection process takes place after process B. Therefore equalities of these key informations are selected out while equalities of character informations initiate process C.

Now the two primary functions mentioned above will be discussed in order. First, when one presses a key on a keyboard, the character of the key will normally appear at the cursor location on the display, and cursor 14 will move one space ahead. Similarly, when one strikes another key, the character at the key will be diplayed next to the previous character, and cursor 14 will move ahead one space again.

When one strikes a character key on the keyboard, this information is caught in process A as character information 10 as in FIG. 1, FIG. 4, and FIG. 5. Next, in process B, next character information 12 is compared with previous character information, that is, character information 10 which has been caught in process A. When one has struck the same key twice in succession, character information 10 and next character information 12 are equal. This equality or sameness initiates a backspace movement by cursor 14, i.e., cursor 14 moves one space back. This is process C. Therefore if one has struck a wrong key creating a typo, immediately striking the same key again will erase the error. One may then strike the correct key. Second, to correct a typo more than one space behind cursor 14, one may simply press again the last key pressed to move cursor 14 back one space as described above. Successive strikes on the same key will continue to move cursor 14 back one space at each strike until cursor 14 reaches the desired space. At each strike of the key the equality of character information 10 and next character information 12 is determined through process A & B and the desired function is initiated by process C.

In the case where one is required to type consecutive characters like "aa", one first types initial "a". One then strikes any key other than "a" twice and then types the second "a". This requires two extra strokes compared to the conventional method of creating consecutive character on the screen.

As described previously pressing the Esc key after striking the initial "a" will automatically display "aa" on the screen without extra steps.

In detail: Consider the case of consecutive characters "ax" where x is a typographical error. When the "a" key is struck, this information is caught in process A as character information 10 as in FIG. 1, FIG. 4 and FIG. 5. The "a" appears on the screen and cursor 14 moves one space forward. When the next key "x" is struck, next character information 12 "x" is compared to character information 10 "a", and found, through process B to be unequal. Therefore "x" is displayed on the screen next to "a" as "ax". Cursor 14 moves one space forward and x is now character information 10. At a second strike of x next information 12 "x" is compared by process B to character information 10 "x" and found to be equal. By process C cursor 14 immediately moves one space back and deletes the typo "x". Now the second "x" is character information 10. On the screen only the original "a" is displayed. Therefore if one has struck a wrong key, creating a typo, a second consecutive stroke of the same key till erase the error and allow an immediate correction.

Second, to correct a typo more than one space behind cursor 14 one may simply press again the last key pressed to move cursor 14 back one space as described above. Successive strikes on the same key will continue to move cursor 14 back one space at each strike until cursor 14 reaches the desired space. At each strike of the key the equality of character information 10 and next character information 12 is determined through processes A and B. The desired function is initiated by process C in the same manner as described above.

In the case where one is required to type consecutive characters such as "aa", one simply strokes the "a" key once, then two consecutive strokes of any other character key, and then the second "a" is stroked. The "aa" will appear on the screen by the same process as described.

If consecutive characters appear as many as 10 times in a screen display, there are 2×10 or 20 extra steps, since each double letter requires 2 extra key strokes. However as described before, poor typists and beginners will make 875 extra steps in a screenful of work, wasting much more time and effort in the various adjustments and readjustments of eyes and hands.

More simply, if the Esc key is pressed, the character next left to the cursor on the display will automatically appear at the cursor location, and the cursor will move to the next right space. This is shown in FIG. 4. Therefore, to type consecutive characters such as "aa", striking the first "a" and then the Esc key will cause "aa" to appear on the display. The Esc key is used because it is an unassigned key and close to the left fingers. By this method no extra steps are required to type consecutive characters.

This next system is different from the previous one. Here, process D, unlike process B, compares directly key information 16, which has been created by the striking of any keyboard key and caught through process A, with the key information from each key in a group of keys (for instance, the group of key keys comprised of the 1, 2, 3, 4, 5, 6, 7, 8, 9, 0 keys and the +, and −keys in the system in FIG. 7). If an equality is found, then key information 16 is changed through process C to a backspace key information, and cursor 14 will move one space back. Therefore, through process A, D, and C, any key in a designated group of keys will function as a backspace key.

The example group of key informations comes from the top row of the keyboard (on a standard keyboard). Poor typists and beginners have trouble accurately striking the number keys because they are the most distant from the center key row. This system will completely ignore the original key information (i.e., i.e., the numbers 1–9 and 0 and the + and − keys) for a while and instead will use them as backspace keys. Typists may blindly press any of these keys at the top (the numbers keys) or right side of the keyboard (+ and − keys) to move cursor 14 one space back and erase the last character on the screen. These keys are very conveniently used as backspace keys since many manuscripts and typed material use these keys very little or not at all. However, the system has a switch S so that one can switch off the system and consequently be able to use the number, +, and − keys again whenever one needs to use them. To turn off the system, press a Ctrl key and a Pg Dn simultaneously. To turn on the system, press a Ctrl key and a Pg Up key simultaneously. Similarly, another group of key informations is comprised of the F1, F2, F3, F4, F5, F6, F7, F8 , F9, and F10 keys shown in FIG. 8. If one strikes randomly any one of these keys on the keyboard, cursor 14 will move back one space. The system in FIG. 8 can also have a switch S as shown in FIG. 7. If a word processing program does not utilize these keys, the program in FIG. 8 can work with the word processing program.

SUMMARY, RAMIFICATIONS, AND SCOPE

Accordingly, the reader will see that the Multi-backspace Key System for Keyboard Operation provides even unskilled computer and word processor operators the means to utilize the keyboard with ease and to work efficiently.

Inexperienced keyboard operators are encouraged to guess at key locations and learn from their mistakes. They are able to maintain the proper keyboard technique of keeping their eyes on the display screen and they can eradicated a key stroke error simply by repeating the key stroke (or any other key stroked successively) which, through the Multi-Backspace Key System, will backspace the cursor. This easy trial and error method helps to eliminate "keyboard allergy". Experienced as well as inexperienced keyboard operators also benefit from this system in that they are not required to use the backspace or cursor left keys at all. This helps prevent right hand finger stress and injury caused by the unnatural movement required to strike these keys.

Furthermore, the Multi-Backspace Key System has additional advantages in that:

it permits almost any keyboard key to give the erase function of a backspace or cursor left key;

it permits the beginner keyboard operator to erase a typo easily and immediately with 100% accuracy without looking at the keyboard;

it allows keyboard operators to erase an error by striking almost any key on the keyboard which helps them not look at the keyboard;

it offers many, many erase keys besides the backspace and cursor left keys so that users who are accustomed to harmful reaches across the keyboard can use other closer keys, consequently preventing or relieving finger stress or possible injury of their right hands;

it invites poor typists to keep their eyes comfortably on the display screen at all times; this will result in reduced eye strain by eliminating the strain caused by excessive up and down eye movement or from the color change between the display and the keyboard;

it encourages poor users to guess at the location of an intended key without looking at the keyboard; Even if they make a mistake, they can correct it readily, simply by pressing the same key again and then choosing the right key (which is most often nearby the mistaken key); This habit of not looking at the keyboard will improve their typing skill;

it is designed to help users make guesses and easy corrections; this will make the users more comfortable and promote effective work;

it can be a latent system and work harmoniously with many favorite word processing or other programs such as operation systems; therefore, people can learn how to type while using a word processing program or the operation system at the same time;

it can be turned on or off according to need, and the computer is not unnecessarily shut off and started again to remove the system;

it can be produced as a feature or function within a word processing program, so beginners may benefit from the system while using the program;

it provides users with a typing tutor while they complete writing work, without having to wait for their typing skills to develop;

it requires almost no instruction to use;

it is very inexpensively produced;

it permits the cursor to move back one space and to erase an error if users have pressed a wrong key simply by pressing the same key again;

it allows users to move the cursor if they find an error some spaces back of what they have just typed by means of continuous stroking of any one key until the cursor reaches the error;

it allows users to press any of a group of keys such as the group comprised of the 1 to 9, 0, +, and − keys or the group of the F1 to F10 keys when the cursor is required to move one or more spaces back.

Although the description above contains many specificities, these should not be construed as limiting the scope of the invention but as simply providing illustrations of some of the presently selected embodiments of this invention. For instance, it has other possibilities in the comparison between two key informations in process B: next character information 12 and key information 16; next key information 18 and character information 10.

Thus the scope of the invention should be determined by the appended claims and their legal equivalents, rather than by the examples given.

I claim:

1. A method for moving a cursor back one space by a second, same character key stroke at a keyboard, comprising the steps of: catching and storing a key information when a key is stroked at said keyboard; selecting a character information from said key information; comparing said key information in a storage area with a next key information immediately following said key information; and moving said cursor one space back on the display if both said key information and said next key information are the same, whereby unskilled keyboard operators can press the same character key immediately after a typo or can press any extra character key twice to move said cursor back one space with 100% accuracy and with ease.

2. The method of claim 1 wherein said storing of said key information is placed at various locations.

3. The method of claim 2 wherein said various locations includes the location after the comparison and after the movement of said cursor.

4. The method of claim 1 wherein the selection of a character information is placed before said comparison instead of the later stage.

5. The method of claim 1 wherein said key information is a character information resulting from a character key stroke at said keyboard.

6. The method of claim 1 wherein said next key information is said next character information immediately following said character information.

7. The method of claim 1 wherein said storage area includes the display screen as an indirect storage.

8. The method of claim 1 wherein said storage areas are located in more than one place.

9. The method of claim 1, further including a switch means which turns on and off said method, and which is located after the step of catching and storing said key information.

10. The method of claim 9 wherein said switch means deactivates said method by the simultaneous stroking of the Ctrl key and the Pg Dn key and activates said method by simultaneous stroking of said Ctrl key and the Pg Up key on the keyboard.

11. The method of claim 1, further including a new assignment for an unused key to produce consecutive characters on said display.

12. The method of claim 1, further including accomplishment with computer languages including Basic, Assembler, and C language.

* * * * *